United States Patent [19]

Obreschkow

[11] 4,030,113

[45] June 14, 1977

[54] CAMERA FITTING

[76] Inventor: Christo Obreschkow, 1507-805 W. Broadway, Vancouver, British Columbia, Canada, V5Z 1K1

[22] Filed: Sept. 19, 1975

[21] Appl. No.: 614,945

[52] U.S. Cl. .............................. 354/286; 240/1.3; 350/255

[51] Int. Cl.² .................... G02B 7/04; G03B 15/02; G03B 17/00

[58] Field of Search .......... 354/286, 272, 232, 202, 354/62, 63, 268, 145, 126, 270; 350/252, 255, 183

[56] References Cited

UNITED STATES PATENTS

| 2,238,371 | 4/1941 | Pollock | 354/286 |
| 2,969,008 | 1/1961 | Ferrari et al. | 354/232 |
| 3,663,093 | 5/1972 | Kogaku | 350/252 X |
| 3,688,662 | 9/1972 | Smith | 354/126 |
| 3,722,390 | 2/1972 | Schlapp et al. | 354/270 |
| 3,852,790 | 12/1974 | Robinson | 354/145 |
| 3,858,225 | 12/1974 | Hasegawa et al. | 354/286 X |
| 3,914,026 | 10/1975 | Kanno | 350/255 |
| 3,915,557 | 10/1975 | Shimojima | 350/255 X |

FOREIGN PATENTS OR APPLICATIONS 660,865  11/1951   United Kingdom .............. 350/255

Primary Examiner—Donald A. Griffin
Attorney, Agent, or Firm—Larson, Taylor and Hinds

[57] ABSTRACT

A camera fitting adapted to be interposed between the master lens and the body of a camera. The fitting permits the formation of close-up images. The fitting comprises a lens system mounted in a lens carrier. The lens carrier can reciprocate in a sleeve and there is means to determine the direction and extent of the reciprocation, and thus of the size of the image produced. At a first end of the fitting there is means to permit mounting of the fitting in place of the master lens of the camera. At a second end of the fitting there is means to permit mounting of said master lens in the fitting.

9 Claims, 2 Drawing Figures

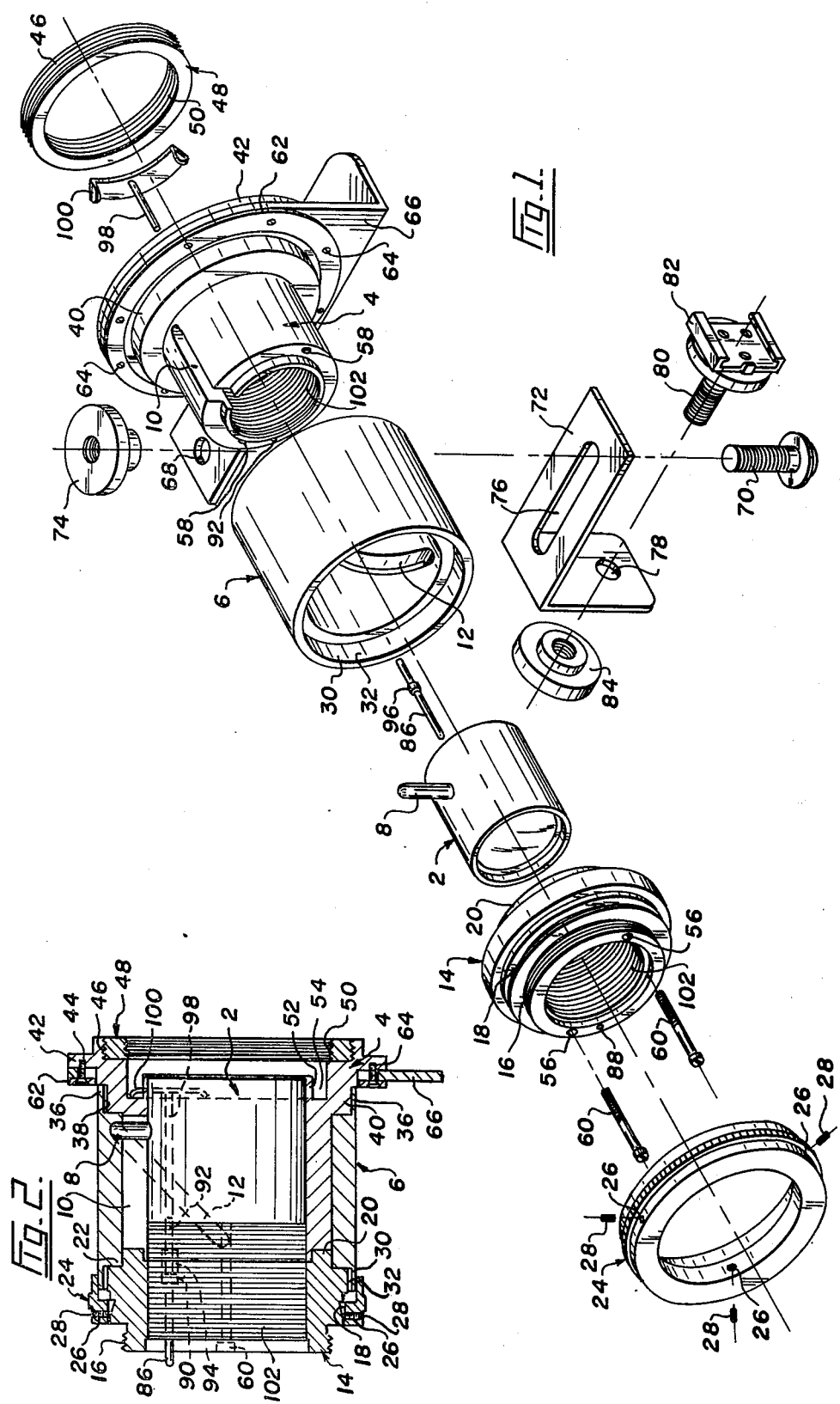

CAMERA FITTING

FIELD OF THE INVENTION

This invention relates to a camera fitting adapted to be interposed between the master lens and the body of a camera for a wide range of magnifications. The invention has a broad application in close-up photography and, perhaps most importantly, in medical and dental photography.

DESCRIPTION OF THE PRIOR ART

In medicine and in dentistry there is frequently a need to take photographs of parts of the body. The resulting photographs are useful as a general reference and also find particular use in teaching. For example, any unusual or particularly interesting condition can be photographed and used in subsequent lectures and demonstrations. However, with available equipment, it can be difficult to obtain photographs of reasonable quality at reasonable expense where the condition to be photographed is within a body cavity or, in particular, within the mouth. The present invention seeks to correct this difficulty.

SUMMARY OF THE INVENTION

Accordingly the present invention is a camera fitting adapted to be interposed between the master lens and the body of a camera to allow close-up images. The fitting comprises a lens system mounted in a lens carrier, a sleeve in which the lens carrier can reciprocate, means to determine the direction and extent of the reciprocation of the lens carrier within the sleeve and thus of the magnification produced, means at a first end of the fitting to permit mounting of the fitting in place of the master lens of the camera and means at a second end of the fitting to permit fitting of the master lens.

In a preferred embodiment the fitting includes a bracket to receive a flash unit. It will be appreciated that in the positions in which the camera fitting of the invention is useful flash lighting of the subjects is usually essential. It is also generally desirable that the flash be rotatable around the fitting but locatable by frictional contact. By this means the bracket can be rotated to the appropriate position and will remain in that position because of the frictional engagement.

The means to determine direction and extent of the reciprocation of the lens carrier within the sleeve and thus of the magnification produced, can be selected from a wide range. In an embodiment that has proved useful, the lens carrier is provided with an outwardly extending peg that engages in a slot formed in a first sleeve. The fitting is provided with an external sleeve that engages with that part of the peg extending through the slot of the first sleeve. The external sleeve is formed with a helical groove that engages the peg. By this means rotation of the second sleeve causes longitudinal reciprocation of the lens carrier within the first, slotted sleeve.

It is generally desirable to mark on the exterior of the fitting some indication of the magnification obtained for a particular position of the lens carrier. In the useful embodiment referred to above desired magnifications can be achieved roughly by aligning a mark on the rotating sleeve with a mark on the fixed or non-rotating part of the fitting. The required fine adjustments are then made by the photographer as he observes the object.

Desirably the device includes means of operating the automatic diaphragm shutdown that is a part of most modern cameras.

The device is particularly useful for single lens reflex cameras used with electronic flash units.

BRIEF DESCRIPTION OF THE DRAWINGS

The invention is illustrated in the accompanying drawings in which:

FIG. 1 is an exploded view of a camera fitting according to this invention; and

FIG. 2 is a section through the fitting illustrated in FIG. 1.

DESCRIPTION OF THE PREFERRED EMBODIMENTS

The drawings show a camera fitting comprising a lens carrier 2 able to reciprocate within a first sleeve 4 that, in turn, is positioned within a second sleeve 6. To permit this reciprocation the carrier 2 is provided with a peg 8 which projects through a slot 10 in the first sleeve 4 to engage with a helical groove 12 in the second sleeve 6. Such an arrangement is well known in optical instruments and its equivalents may also be used here.

At the end of the fitting that engages the camera there is a first collar 14 having on its outer end an external thread 16. The collar 14 is provided with a peripheral channel 18 and a flange 20 projecting away from the thread 18 and positioned on the opposite surface of the collar 14. The flange 20 defines a recess 22 (see FIG. 2) which receives the internal surface of the second sleeve 6.

A second collar 24 provided with holes 26 is fixed relative to the collar 14 by screws 28 inserted through the holes 26 to engage in the channel 18.

Second sleeve 6 is provided with a first flange 30 that fits between the second collar 24 and the outer surface of the first collar 14. The inner surface 32 of the flange 30 cooperates with the outer surface of collar 14 and the recess 22 of the first collar 14 to provide partial location of the second sleeve 6.

At the other, or lens end of the fitting, the second sleeve 6 is provided with a flange 36 to form a recess 38 that abuts against the end of a flange 40 formed on the first sleeve 4. First sleeve 4 has a radially projecting flange 42 formed with threaded openings 44. An internal thread 46 receives a collar 48 internally threaded at 50.

First sleeve 4 is formed with an internal peripheral flange 52 that defines a circular channel 54.

The components of the camera fitting are held together by the provision of holes 56 in the first collar 14. First sleeve 4 is formed with threaded holes 58 alignable with the holes 56. A bolt 60 goes through each hole 56 in the first collar 14 to engage in a threaded hole 58 in the first sleeve 4, and thus maintain the components in their relative position. The second sleeve 6 is held between the first collar 14 and the first sleeve 4 but is free to rotate.

A ring 62 is attached to the fitting by bolts 64 engaging in the threaded openings 44 in flange 42. A bracket piece 66 is compressed between the ring 62 and the flange 42 so that the bracket 66 can be turned relative to the remainder of the fitting. At one of its ends bracket 66 is formed with a hole 68 to receive a bolt 70. A second arm 72 of the bracket is attached to the first arm 66 by engaging the nut 74 on the bolt 70. Second arm 72 is provided with an elongated hole 76 so that its position relative to the first arm 66 can be varied. Second arm 72 is also formed with a hole 78 to receive a stud 80 carrying a flash shoe 82. Nut 84 engages on the stud 80 to fasten the shoe 82 in the required position.

Most modern cameras are fitted with automatic diaphragm control whereby the amount of light admitted into the camera can be controlled. The fitting of the present invention has means to enable the automatic diaphragm control to be operated. This comprises a rod 86 that fits through the passageway 88 in the collar 14. As shown in FIG. 2, the passageway 88 is widened at 90. The rod 86 also fits into a passageway 92 formed in the first sleeve 4. Passageway 92 is widened at 94 and the widened portions 90 and 94 of passageways 88 and 92 define a chamber that receives a widened portion 96 on the rod 86. Thus, the rod 86 can not fall from the fitting once the fitting is put together. The rod 86 abuts a similar rod 98 within passageway 92. Rod 98 is attached to an actuator 100 located within channel 88. Actuator 100 is able to activate the automatic diaphragm shutdown in the master lens of the camera. In fact the rod 86, rod 98 and the actuator 100 is a simple extension of the existing automatic diaphragm control of the master lens of the camera.

Desirably, the interior of the device, in particular the interior of first sleeve 4 and collar 14, are provided with a series of rings 102 and coated with a flat black material to prevent internal reflection.

The interior of the lens carrier 2 is not shown because it may vary widely. The lens system from a 2X teleconvertor has given excellent results. However, it is envisaged that a 2½X teleconvertor and 3X teleconvertor would be satisfactory. Such lens systems may have any combination of lenses able to extend the focal length of the master lens in such a way to permit close-up photography. Lens systems that have been used have included 2, 4, 6 and 8 lenses.

To use the illustrated device the master lens of a camera is removed. The illustrated device is then inserted into the camera body and threaded into place by threads 16 on collar 14. When the fitting is in position, the master lens of the camera is inserted in the internal thread 50 of collar 48. A flash unit may be installed on the flash shoe 82 and the modified camera is then ready for use to take close-up photographs.

The varied magnification may be roughly set according to a scale or guide (not shown) marked on the exterior of the fitting. This is achieved by rotating the external sleeve 6 and thus moving the lens system 2 within first sleeve 4 by the interaction of peg 8, slot 10 and groove 12 in known manner. The object is then viewed and fine adjustment of the sleeve 6 and thus of the position of the lens carrier 2 is made. The photograph can then be taken.

Using a single lens reflex camera and a lens system permitting magnification from approximately 1:8.5 (M .114) to 1.375 X (M 1.375) the illustrated device has been used to achieve excellent results. It has been used with cameras having master lenses of 50 mm, 55 mm and 58 mm focal length. The fitting used had a tube length of 52 mm and the lens element was taken from a 2X teleconvertor. The path along which the lens systems moved as approximately 25 mms.

It must be emphasized that the essential feature of the present invention is the provision of the controllably movable lens carrier 2. The means of attaching the device according to the invention to a camera depends entirely on the design of the camera. Thus, if the device is to be used with a camera having the well-known bayonet fitting for the lens then the device according to the present invention will dispense with the external thread 16 on collar 14 and be fitted with a bayonet fitting to fit into the camera body. Similarly, the internal thread 50 on collar 48 will be replaced by a bayonet fitting. The master lens can then be positioned in the device using the same means by which it is normally attached to the camera. These methods of attaching the master lens to cameras are well established in the art.

The automatic diaphragm control 86 also differs from camera to camera. The forward and backward type, such as illustrated in the drawings, may be replaced by a lever that moves circumferentially around the device. This latter system is used, for example, on cameras available under the Trade Mark MINOLTA. The device is normally spring loaded to return it to rest position. Similarly, the rods 86 and 98 together with the actuator 100 can be used to control the exposure meter, for example for those cameras available under the Trade Mark PENTAX. In the above Minolta cameras the lateral or circumferential moving lever only controls the diaphragm. The actuation of the diaphragm control and/or the exposure meter are not features of the present invention. The device of the present invention is merely provided with means to enable the exposure meter or diaphragm control built into the camera to be operable even though the device according to the present invention is interposed between the camera and the master lens.

What is claimed is:

1. A lens containing converter adapted to be removably interposed between the standard master lens and the body of a single lens reflex camera to permit the formation of close-up images comprising;
    a lens system mounted in a lens carrier;
    a sleeve in which the lens carrier can reciprocate;
    means to determine the direction and extent of the reciprocation of the lens carrier within the sleeve and thus of the size of the image produced;
    means at a first end of the lens containing convertor to permit mounting of the lens containing convertor in place of the standard master lens of the camera; and
    means at a second end of the lens containing convertor to permit mounting of said standard master lens on the lens containing convertor.

2. A lens containing converter as claimed in claim 1 in which the lens system is a combination of lenses able to produce a magnification of 1:8.5 (M .114) to 1:375 X (M 1.375).

3. A lens containing converter as claimed in claim 2 in which the lens system contains four lenses and is the lens system available from a 2X teleconvertor.

4. A lens containing converter as claimed in claim 1 in which the lens carrier is provided with an outwardly extending peg that engages in a slot formed in a first sleeve and in which the lens converter is provided with an external sleeve that engages with that part of the peg extending through the slot of the first sleeve, the external sleeve being formed with a helical groove that engages the peg whereby rotation of the second sleeve causes longitudinal reciprocation of the lens carrier within the first, slotted sleeve.

5. A lens containing converter as claimed in claim 1 in which the means at the first end of the lens containing converter to permit mounting of the lens containing converter in place of the master lens of the camera is an externally threaded collar adapted to engage in the thread in the front of the camera body which normally receives the master lens.

6. A lens containing converter as claimd in claim 5 in which the means at the second end of the lens containing converter to permit mounting of said master lens on the lens containing converter is an internally threaded collar able to receive the thread of the master lens of the camera.

7. A lens containing converter as claimed in claim 1 including a bracket to receive a flash unit.

8. A lens containing converter as claimed in claim 7 in which the bracket can rotate around the fitting.

9. A lens containing converter as claimed in claim 1 including means to couple with the existing diaphragm mechanism in the master lens and with the existing diaphragm actuating mechanism in the camera whereby movement of the actuating mechanism in the camera body causes actuation of the diaphragm mechanism in the master lens as though the lens converter were not present.

* * * * *